April 18, 1967

S. H. MICK 3,314,663

CARBURETOR

Filed Dec. 27, 1965

INVENTOR.
Stanley H. Mick
BY
C. K. Veenstra
ATTORNEY

United States Patent Office 3,314,663
Patented Apr. 18, 1967

3,314,663
CARBURETOR
Stanley H. Mick, St. Clair Shores, Mich., assignor to General Motors Corporation, Detroit, Mich., a corporation of Delaware
Filed Dec. 27, 1965, Ser. No. 516,510
5 Claims. (Cl. 261—41)

This invention relates to a carburetor main well construction having both high and low flow capacity passages which assure an adequate delivery of liquid fuel under all conditions of operation.

In air valve carburetors, which meter fuel past a metering rod positioned by an air flow sensing valve, engine stalling due to improper fuel delivery has been encountered upon a sudden closure of the carburetor throttle. It has been discovered that the stalling is caused by a separation of the liquid fuel from a fuel foam flowing through the main well to the discharge nozzle. Upon separation, the flow of liquid fuel through the nozzle is momentarily interrupted and the engine stalls.

This invention provides a carburetor main well having closely spaced walls which form a restricted fuel passageway adapted to maintain liquid fuel suspended in the fuel foam to assure continuous delivery of liquid fuel through the nozzle.

This invention additionally provides a main well having a separate high flow capacity fuel passage which delivers fuel when the engine demand exceeds the capacity of the restricted fuel passageway. A valve responsive to fuel demand controls flow through this high capacity passageway.

The details as well as other objects and advantages of this invention are disclosed in the following description and in the drawing in which.

Figure 1:
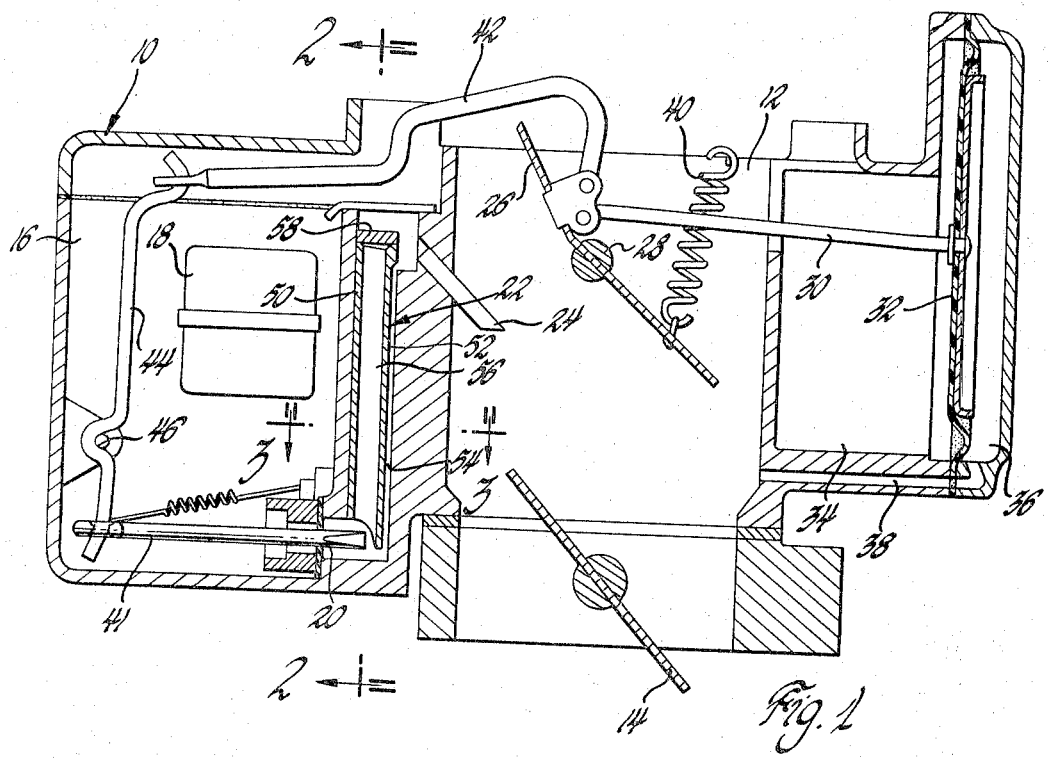
FIGURE 1 is an elevational view of a carburetor shown in section to illustrate the main well construction.

Referring first to FIGURE 1, a carburetor 10 includes a mixture conduit 12 controlled by a throttle 14 in the customary manner. Fuel in a fuel bowl 16 is maintained at a substantially constant level by a conventional float mechanism 18. Fuel is delivered to mixture conduit 12 from bowl 16 through a metering orifice 20, a main well 22, and a nozzle 24.

A butterfly type air valve 26 is pivotally disposed in mixture conduit 12 upon a shaft 28. A link 30 connects air valve 26 to a flexible diaphragm 32. The chamber 34 to the left of diaphragm 32 is exposed to the pressure in the inlet of mixture conduit 12 and the chamber 36 to the right of diaphragm 32 is connected by a passage 38 to the mixture conduit 12 at a point between air valve 26 and throttle valve 14. A spring 40 biases air valve 26 to a closed position.

In operation, as throttle 14 opens, the vacuum existing therebelow is applied against the downstream side of air valve 26 and against the right-hand side of diaphragm 32. Such vacuum tends to open air valve 26 which admits air to reduce the pressure differential thereacross. Diaphragm 32 and spring 40 cooperate to position air valve 26 so that a substantially constant subatmospheric pressure is maintained below air valve 26. The position of air valve 26 is thus indicative of the rate of air flow to the engine.

Air valve 26 is connected to a metering rod 41 through a link 42 and a lever 44 which is pivoted at 46. As air valve 26 opens, lever 44 withdraws metering rod 41 from metering orifice 20 to increase the flow through main well 22 and nozzle 24. Thus the air-fuel mixture delivered to the engine is properly proportioned throughout the wide range of air flow rates.

Under some conditions of high speed operation, the liquid fuel flowing through main well 22 froths into a fuel foam. If the rate of fuel flow through orifice 20 is suddenly reduced, as upon a sudden closure of throttle valve 14, the foam in main well 22 separates with the liquid fuel sinking to the bottom. Until sufficient liquid fuel is metered through orifice 20 to refill main well 22, only fuel vapor is delivered through nozzle 24. The lack of fuel causes stalling of the engine.

Figure 2:
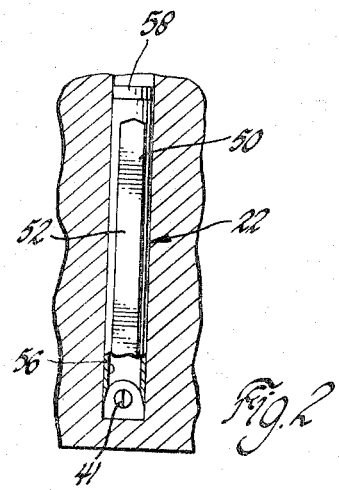
FIGURE 2 is a view along line 2—2 of FIGURE 1 showing the details of an insert in the main well.
Figure 3:
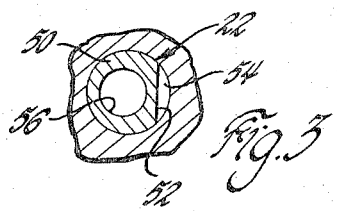
FIGURE 3 is an enlarged sectional view along line 3—3 of FIGURE 1 illustrating the relative sizes of the high and low flow capacity passages.

As shown in greater detail in FIGURES 2 and 3, a tubular insert 50 is positioned in main well 22. One side of insert 50 has been flattened off, as indicated at 52 in FIGURE 3, to provide a restricted passage 54. By forming passage 54 so that the wall 52 of insert 50 is closely adjacent the peripheral wall of main well 22, liquid fuel is prevented from separating out of the fuel foam. It is believed that the closely spaced walls of passage 54 provide a capillary action preventing the liquid fuel from sinking to the bottom. Thus a continuous flow of liquid fuel is maintained through nozzle 24 to prevent the engine from stalling.

Insert 50 has a large central passage 56 adapted to deliver fuel when engine demand exceeds the capacity of passage 54. Passage 56 is closed by a disk valve 58 which seats on the top of insert 50. As air flow through mixture conduit 12 increases and air valve 26 pulls metering rod 41 from orifice 20, the pressure of fuel flow in the bottom of main well 22 increases and raises disk valve 58 to allow fuel flow through passage 56.

It will, therefore, be appreciated that this invention provides a carburetor which includes means controlling fuel flow through main well 22 to assure a continuous discharge of liquid fuel from nozzle 24 but in which the capacity of the carburetor to deliver fuel at a high rate is not limited.

I claim:

1. An internal combustion engine carburetor including a mixture conduit, a fuel bowl, and a main well having an inlet from said fuel bowl and a discharge nozzle extending into said mixture conduit, said main well further including means forming high and low flow capacity portions and valve means associated with said high flow capacity portion and controlling fuel flow through said high flow capacity portion in response to engine demand, said low flow capacity portion comprising a capillary passage adapted to maintain liquid fuel in a fuel foam suspension when engine demand suddenly drops to thereby continuously discharge liquid fuel from said nozzle and prevent engine stalling.

2. The carburetor of claim 1 wherein said main well comprises a passage having a peripheral wall, tube secured in said passage and providing a high flow capacity portion, said tube having a portion radially spaced from said wall and providing said low flow capacity portion.

3. The carburetor of claim 2 wherein said tube extends concentrically within said passage and tangent said wall, said tube having a recessed portion radially spaced from said wall providing said low flow capacity portion.

4. The carburetor of claim 2 wherein said tube extends vertically and wherein said valve means comprises a disk closing the top of said tube, said disk seating on said tube to prevent fuel flow therethrough at low engine demand and being raised from said tube by a differential in pressure in said tube and in said nozzle to permit fuel flow through said tube at high engine demand.

5. The carburetor of claim 1 which further includes a metering system comprising an air valve rotatably disposed in said mixture conduit upstream of said nozzle, the rotative position of said air valve being determined by and being a measure of the rate of air flow through said mixture conduit, a fuel metering orifice in said inlet to said main well, a metering rod controlling flow through said orifice, and means connecting said metering rod and said air valve whereby said metering rod is withdrawn from said orifice to increase the effective fuel discharge area during air valve opening movement and fuel is delivered to said mixture conduit in accordance with air flow therethrough.

References Cited by the Examiner

UNITED STATES PATENTS

| | | | |
|---|---|---|---|
| 2,187,885 | 1/1940 | Markham | 261—69 X |
| 2,512,085 | 6/1950 | Boller | 261—121 X |

HARRY B. THORNTON, *Primary Examiner.*

T. R. MILES, *Assistant Examiner.*